United States Patent [19]

Belart et al.

[11] Patent Number: 4,745,750

[45] Date of Patent: May 24, 1988

[54] AUXILIARY-ENERGY-SUPPLIED BRAKE SLIP CONTROL SYSTEM OF A VEHICULAR HYDRAULIC BRAKE SYSTEM

[75] Inventors: Juan Belart, Walldorf; Wolfram Seibert, Pfungstadt; Norbert Ocvirk, Offenbach; Juergen Schonlau, Niedernhausen; Guenter Trach, Offenbach, all of Fed. Rep. of Germany

[73] Assignee: Alfred Teves GmbH, Frankfurt Am Main, Fed. Rep. of Germany

[21] Appl. No.: 908,789

[22] Filed: Sep. 18, 1986

[30] Foreign Application Priority Data

Sep. 18, 1985 [DE] Fed. Rep. of Germany ....... 3533256

[51] Int. Cl.$^4$ ............................................. B60T 13/00
[52] U.S. Cl. ..................................... 60/547.1; 60/577; 60/591; 303/119
[58] Field of Search ...................... 60/577, 591, 547.1, 60/574; 303/114, 119

[56] References Cited

U.S. PATENT DOCUMENTS

| | | | |
|---|---|---|---|
| 4,467,605 | 8/1984 | Smith | 60/577 |
| 4,643,488 | 2/1987 | Reinartz | 60/591 |
| 4,662,688 | 5/1987 | Reinartz | 60/577 |
| 4,665,701 | 5/1987 | Bach | 60/577 |

FOREIGN PATENT DOCUMENTS 2605625 9/1976 Fed. Rep. of Germany .
2148428 5/1985 United Kingdom .

*Primary Examiner*—Abraham Hershkovitz
*Attorney, Agent, or Firm*—James B. Raden; Robert P. Seitter

[57] ABSTRACT

An auxiliary-energy-supplied brake slip control system of a vehicular hydraulic brake system with a brake-pedal-operable master cylinder arrangement (12) and with auxiliary energy supply into the working chamber (16) of the master cylinder. The master cylinder piston (23) portion facing the working chamber (16) is enclosed by a sleeve (58) which is longitudinally displaceable with respect to the master cylinder piston (23) and the master cylinder bore (63). The master cylinder piston (23) having radially extending projections or a collar (66) which, in the brake release phase, rests at the working-chamber-side front face of the sleeve (58) and moves the same back into its initial position. The booster-side front face of the sleeve (58) confines an annular space or a chamber (69) provided in the master cylinder housing and communicates with the booster chamber (21) by way of a pressure line (64). Thus in case of a defective hydraulic brake booster (11) the sleeve (58) remains in its initial position and only the cross-sectional surface of the master cylinder piston (23) being effective, which provides abrupt change in ratio.

4 Claims, 1 Drawing Sheet

U.S. Patent May 24, 1988 4,745,750
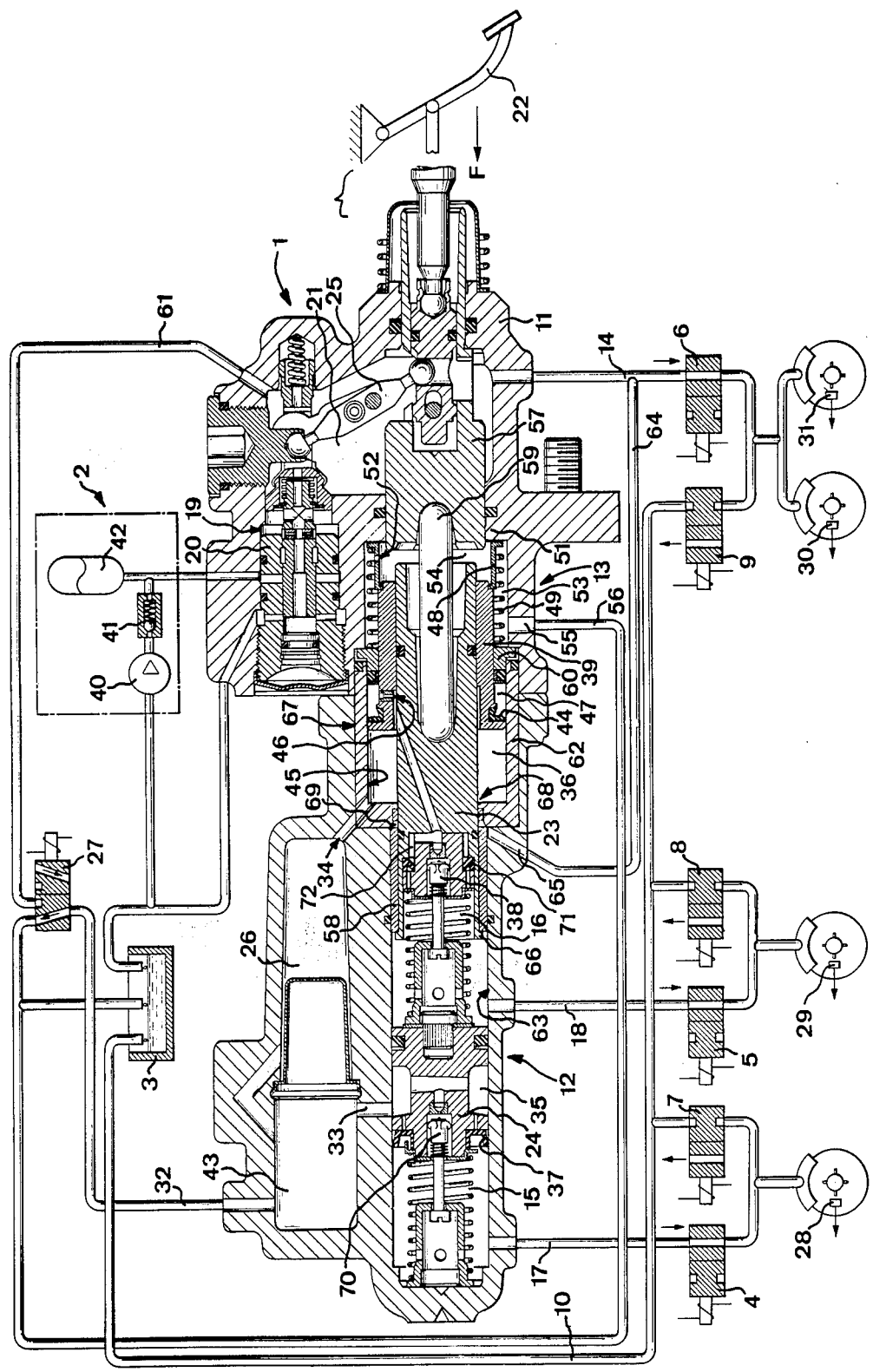

AUXILIARY-ENERGY-SUPPLIED BRAKE SLIP CONTROL SYSTEM OF A VEHICULAR HYDRAULIC BRAKE SYSTEM

BACKGROUND OF THE INVENTION

This invention relates to an auxiliary-energy-supplied brake slip control system for a vehicular hydraulic brake system with a brake-pedal-operable master cylinder arrangement, a master cylinder piston, and an associated prechamber wherein a feed bore ends for the supply of auxiliary energy into the working chamber of the master cylinder.

A hydraulic brake system (P 35 07 484.1) is known which consists of a pedal-operated brake booster connected with the master cylinder and having a booster piston a booster chamber, wherein, by way of a brake valve, an auxiliary pressure is established which is proportional to the foot pressure. The system includes a pressure medium source which is provided with wheel brakes connected to the master cylinder and with a filling-stage cylinder with a two-stage piston displaceably housed in the stepped bore thereof. A pressure chamber is provided in front of the large stage of the two-stage piston and with a filling chamber arranged in front of the small stage of the two-stage piston. The pressure chamber communicates with the booster chamber and the filling chamber being connected to one of the working chambers of the master cylinder and/or to the brake lines.

In this known brake booster, a non-return valve is connected in the connection line connecting the booster chamber with the pressure chamber of the filling stage cylinder, with the control slide of the brake valve cooperating with a valve body by wat of which the brake valve is connected with the pressure chamber.

Further, an auxiliary-energy-supplied brake slip control system is known (pending U.S. application Ser. No. 836,687 filed Mar. 12, 1986 and corresponding to German application (P 35 08709.9) which is provided with a filling-stage cylinder with a two-stage piston displaceably housed therein and with a pressure chamber provided in front of the large stage of the two-stage piston and with a filling chamber arranged in fron of the small stage of the two-stage piston. By way of a pressure line the filling chamber communicates with one of the working chambers of the master cylinder and/or with a brake line. In this brake slip control system the booster piston plunges into an annular chamber arranged between the master cylinder and the brake booster. The annular chamber communicates with the pressure chamber of the filling-stage cylinder, on the one hand, and with the supply reservoir, on the other hand, with a valve being connected in the pressure medium path from the annular chamber to the supply reservoir. The valve is operable by the pressure in the booster chamber and, in one of its positions, the valve locks the pressure medium passage to the supply reservoir and thus permits the pressure medium to flow from the annular chamber into the pressure chamber of the filling-stage cylinder during the braking operation. In its other position, the valve connects the annular chamber with the supply reservoir.

This known brake system, however, is disadvantageous in that it is comparatively expensive and intricate and voluminous as a special filling-stage cylinder must be provided in addition to the tandem master cylinder and to the hydraulic brake booster, respectively.

It is thus an object of the present invention to provide a brake system of the foregoing type which, upon a failure of the booster, will work with a reduced effective master brake cylinder surface, which will have a particularly simple design, and which will enable a narrow and largely compact construction.

SUMMARY OF THE INVENTION

According to this invention, this object is achieved by a sleeve displaceably supported within the master cylinder bore and enclosing the master cylinder piston in a ring-shaped manner. The front face of the sleeve which is averted from the working chamber of the master cylinder is pressurized by the pressure in the booster chamber, with the master cylinder piston having an abutment, e.g., a projection or a collar, which cooperates with the sleeve and moves the same into its initial position upon the release of the brake. Preferably, the master cylinder piston has a radially outwards extending collar at its end facing the working chamber, with the collar resting at the working-chamber-side front face of the sleeve in the brake release position.

Advantageously, a cup-shaped component is provided which is inserted into the master cylinder housing bore, the bottom part of the component having an opening wherethrough the master cylinder piston is sealingly guided. A positioning sleeve is supported in a longitudinally displaceable manner in the bore of the cup-shaped component and encloses the master cylinder piston or the shaft portion thereof and therewith forming the prechamber which communicates with the filling chamber by way of a channel. Together with the master cylinder piston, the master cylinder bore, and the sleeve, the bottom part of the cup expediently forms a chamber communicating with the booster chamber by way of a pressure medium path.

BRIEF DESCRIPTION OF THE DRAWING

This invention can be provided various embodiments, one of which is schematically represented in more detail in the accompanying drawing wherein the single FIGURE illustrates a brake slip control system in accordance with the present invention.

DETAILED DESCRIPTION

According to the drawing, the brake system of the present invention essentially comprises a pedal-operated elongated hydraulic braking pressure generator the entire unit of which is marked 1. The system includes an auxiliary pressure source 2, a storage and pressure compensation reservoir 3, and electromagnetically operable 2/2-way valves 4 thourgh 6, by way of which respectively the wheel brakes and the front and rear wheels are connected in three hydraulically separate brake circuits. Valves 4–6 are normally open, that is, as long as they are de-energized. Further, a return line 10 is provided which leads from the front wheels and from the rear wheels to the compensation reservoir 3, the return line 10, however, being separated from the wheel brake cylinders by means of three further 2/2-way valves 7–9, as long as valves 7–9 are de-energized. The braking pressure generator 1, on its part, is composed of a hydraulic brake booster 11 and of a master cylinder arrangement 12, as well as of a positioning arrangement 13.

Directly connected to the brake booster 11 is a brake circuit, namely the rear-wheel brake circuit 14, while the two working chambers 15 and 16 of the master cylinder arrangement 12—which in this embodiment has the design of a tandem master cylinder—are connected to one front wheel each by way of separate brake circuits 17 and 18. The two master cylinder circuits of such an arrangement are defined as static pressure medium circuits and the rear axle circuit is defined as a dynamic pressure medium circuit. In circuit 14 the pressure will be determined by the position of a control valve 19 which is pedal-operated by way of linkage 25 and which, depending on the displacement of a valve piston 20, permits more or less pressure to flow from the auxiliary energy source 2 into the booster chamber 21 and, thence, into the brake circuit 14.

The pressure built up in, or metered into, the booster chamber 21 by means of the control valve 19 during the actuation of a brake pedal 22 will simultaneously act on the pistons 23, 24 of the master cylinder arrangement 12 and, as will be understandable without any difficulties, will lead to the build-up of braking pressure in the working chambers 15 and 16 of the two static brake circuits 17, 18 leading to the front wheels. In filling chambers 26, 43 of the master cylinder arrangement 12 at first there will still prevail the atmospheric pressure as the chambers communicate with the pressure compensation reservoir 3 by way of pressure medium path 32 and a so-called main valve 27 in the rest position in which the valve is de-energized.

Provided at each wheel of the vehicle equipped with the inventive brake system is a sensor 28, 29, 30, 31 which, for example, is designed as an inductive transducer and which feeds information on the rotational behavior of the wheel into an electronic control unit. The control unit amoung others contains an electronic combination logic in the form of hardwired or programmable circuits, such as microprocessors, and will generate control commands after the evaluation of the sensor signals. By way of the signal lines (not illustrated) the control commands will be transferred to the respective solenoid valves 4–9 and 27.

Upon the onset of brake slip control, the main valve 27 will be switched over. Thereby a pressure medium path 32 leading from the booster chamber 21 into the filling chambers 26, 43 will be released, thus pressure medium flowing into the filling chambers 26, 43. The pressure will be passed on to prechambers 35, 36 within the master cylinder arrangement 12 by way of connection channels 33, 34. By way of respectively a gasket 37 arranged at the circumference of the piston 24 and having the function of a non-return valve and the valves 38, 70, pressure will be supplied dynamically from the prechambers 35, 36 into the working chambers 15, 16 communicating with the wheel brakes of the front wheels.

The dynamically supplied pressure at the same time will effect the resetting of a positioning sleeve 39 of the positioning arrangement 13, thereby in a known manner the pistons 23, 24 in the master cylinder arrangement 12 and the brake pedal 22, respectively, adopting defined positions.

Because of the dynamic metering of pressure medium into the static brake circuits 17, 18 of the front wheels and into the prechamber 36 governing the resetting pressure acting on the positioning sleeve 39, even in case of frequent pressure reduction the discharge of pressure medium by way of the valves 7 and 8 switched over will exclude that the working chambers 15 and 16 will be controlled "empty".

By means of a lip seal 44 the positioning sleeve 39 is sealed in respect of the bore 45 of a cup-shaped component 62 and has a throttle bore 46 by way of which the pressure medium which has entered into the annular gap by way of the lip seal 44, may flow back into the prechamber 36. In the rest position, the positioning sleeve 39 rests at a collar 51 of the booster housing by way of a bushing 48. The busing 48 has cross holes 52 which establish a permanent pressure medium communication between the intermediate chamber 54 and the annular chamber 53 housing a compression spring 49. The annular chamber 53 is further connected to the return line by way of a port 55 and a pressure medium line 56.

If, during braking pressure control, the prechamber 36 is acted upon by pressure medium being under controlled pressure, then the higher pressure prevailing in the prechamber 36 will move the positioning sleeve 39 in the direction of the brake pedal 22 until it will rest at the collar 51, together with the bushing 48.

A sleeve 58 is supported on the master cylinder piston 23. Sleeve 58, on its part, is displaceable within the master cylinder bore 63. In the brake release position, the sleeve 58 rests at the cup-shaped component 62 through the central opening 68 in which the master cylinder piston 23 is guided. In case of a braking operation, the master cylinder piston 23 supporting itself at the booster piston 57 by way of actuating rod 59 as well as the sleeve 59 will move in the direction of actuation (direction of the arrow F) as the pressure prevailing in the booster chamber 21 does not only act on the booster piston 57 but, by way of the pressure line 64 and the housing port 65, also acts on the pedal-side front face of the sleeve 58. However, if there is a failure of the brake booster 11, the pressure line 64 will remain pressureless upon a braking operation, thus the sleeve 58 remaining in the position illustrated in the drawing so that only the cross-sectional surface of the master cylinder piston 23 will be effective (without the cross-sectional surface of the sleeve 58).

As, in case of failure of the hydraulic brake booster 11, the prechamber 36, on the one hand, communicates with the storage and pressure compensation reservoir 3 by way of the feed bore 34, the filling chambers 26, 43, the pressure medium path 32, and the main valve 27; and as it, on the other hand, communicates with the working chamber 16 by way of a channel arranged in the master cylinder piston 23 and by way of the valve 38 and by way of the annular gap 72 with gasket 71, the master cylinder arrangement 12 will operate conventionally, only the cross-sectional surface of the master cylinder piston 23 sealed with respect to the sleeve 58 being effective in building up the pressure in the working chambers 15, 16. Upon displacement of the master cylinder piston 23 by means of the brake pedal 22 in the direction of the arrow F the pressure building up in the working chamber 16 will move the sleeve 58 against the bottom part of the cup-shaped component 62, thus the chamber 69 remaining pressureless.

What is claimed is:

1. A slip control brake system for use with vehicles, said system comprising a master cylinder having a working chamber and a master cylinder piston slideably arranged therein, a brake pedal operable brake booster connected with the master cylinder piston for assisting the operation of same, said brake booster having a booster chamber connected to an auxiliary energy source by a brake valve for controlling the flow of auxiliary energy into said booster chamber, a prechamber between said booster chamber and said working chamber, said prechamber communicating with said working chamber and with a main valve, said main valve having a first position for connecting said prechamber to a fluid reservoir and a second position for connecting said prechamber to said booster chamber, said main valve being in said first position during a normal brake application and in said second position during a slip control brake application whereby static pressure is utilized during a normal brake application and dynamic pressure is utilized during a slip control brake application, a sleeve slideably arranged on said master cylinder piston and also relative to said working chamber, one end face of said sleeve being closer to said booster chamber than the other end face thereof and being pressurized by fluid in said booster chamber, the other end face of said sleeve being adjacent said working chamber for exposure to fluid in said working chamber, said master cylinder piston having a radial projection adjacent said other end face of said sleeve for moving said sleeve when said master cylinder piston moves toward said brake booster on release of the brake.

2. A slip control brake system as claimed in claim 1 wherein a cup-shaped component is inserted into a bore formed adjacent said working chamber, the bottom part of said component having a central opening wherethrough the master cylinder piston is sealingly guided, a positioning sleeve supported in a longitudinally displaceable manner in a bore formed in the cup-shaped component and enclosing at least a portion of the master cylinder piston and therewith forming said prechamber.

3. A slip control brake system as claimed in claim 2, wherein together with the master cylinder piston, the master cylinder bore, and the sleeve, the bottom part of the cup-shaped component forms a chamber communicating with the booster chamber by way of a pressure medium path.

4. A slip control brake system as claimed in claim 2, wherein the master cylinder piston has an annular chamber connected to the prechamber by way of a channel and which communicates with the working chamber of the master cylinder by way of bores, a gasket arranged in the annular chamber, said gasket acting as a non-return valve and permitting the pressure medium to flow from the prechamber into the working chamber while preventing it from flowing back.

* * * * *